United States Patent [19]
Yu et al.

[11] Patent Number: 5,377,397
[45] Date of Patent: Jan. 3, 1995

[54] BICYCLE DOWNTUBE PROCESSING MACHINE

[76] Inventors: Chih-Wan Yu; Chih-Yung Yu, both of No. 1-2, Kang-Hou Lane, Hsin Hsin Tsun, Ta Tsun Hsiang, Changhwa Hsien, Taiwan, Prov. of China

[21] Appl. No.: 202,024

[22] Filed: Feb. 25, 1994

[51] Int. Cl.6 ............................................. B22P 13/02
[52] U.S. Cl. ..................... 29/33 T; 29/26 A; 83/54; 83/466; 408/30
[58] Field of Search ................... 29/33 R, 33 K, 26 A, 29/33 T, 252 R, 56.5; 408/24, 30, 21; 83/54, 453, 466, 454

[56] References Cited

U.S. PATENT DOCUMENTS

| | | | |
|---|---|---|---|
| 2,542,538 | 2/1951 | Kraeft et al. | 29/252 R |
| 3,991,927 | 11/1976 | Napor et al. | 29/33 K X |
| 4,106,379 | 8/1978 | Spengler | 83/466 |
| 4,123,189 | 10/1978 | Ferlise et al. | 83/54 X |
| 4,680,849 | 7/1987 | Diekman | 29/252 R |
| 4,741,081 | 5/1988 | Redman | 29/33 T X |
| 5,249,818 | 10/1993 | Patterson | 83/54 |

FOREIGN PATENT DOCUMENTS 1143531 3/1985 U.S.S.R. .................. 83/466

*Primary Examiner*—William Briggs
*Attorney, Agent, or Firm*—Varndell Legal Group

[57] ABSTRACT

A bicycle downtube processing machine includes a drill unit for drilling holes on a downtube for a bicycle frame, first cutting unit for cutting the right end of the downtube by punching, a second cutting unit for cutting a downwards bevel edge on the left end of the downtube by punching, a third cutting unit for cutting an inwardly curved top edge on the left end of the downtube by punching, a first locating unit for moving the downtube to the processing position for processing, a second locating unit for holding down the downtube in the processing position, and a control circuit for controlling the operation of the aforesaid units.

3 Claims, 10 Drawing Sheets

BICYCLE DOWNTUBE PROCESSING MACHINE

BACKGROUND AND SUMMARY OF THE INVENTION

The present invention relates to a machine for processing bicycle frame's downtube automatically.

The downtube of a bicycle frame must be processed through different processing processed by different workers to form drill holes in the middle, a downwards bevel and an inwardly curved top edge on the left end, and a bevel edge of the right end (see FIGS. 1 and 2) the processing processes, the downtube must be firmly retained in position or the processing process will not be accurately performed. Because these processing processes require much time and many workers to complete, the manufacturing cost of the downtube cannot be reduced.

The present invention has been accomplished under the aforesaid circumstances. Therefore, the present invention provides a processing machine which processes the downtube automatically by means of the operation of a drill unit to drill holes on a downtube, a first cutting unit to cut the right end of the downtube by punching, a second cutting unit for to cut a downwards bevel edge on the left end of the downtube by punching, a third cutting unit to cut an inwardly curved top edge on the left end of the downtube by punching, a first locating unit to move the downtube to the processing position for processing, a second locating unit to hold down the downtube in the processing position, and a control circuit control the operation of the aforesaid units in proper order.

BRIEF DESCRIPTION OF THE DRAWINGS

FIG. 1A is an elevational view of the downtube of the bicycle frame shown in FIG. 1.

DETAILED DESCRIPTION OF THE PREFERRED EMBODIMENT

Figure 1:
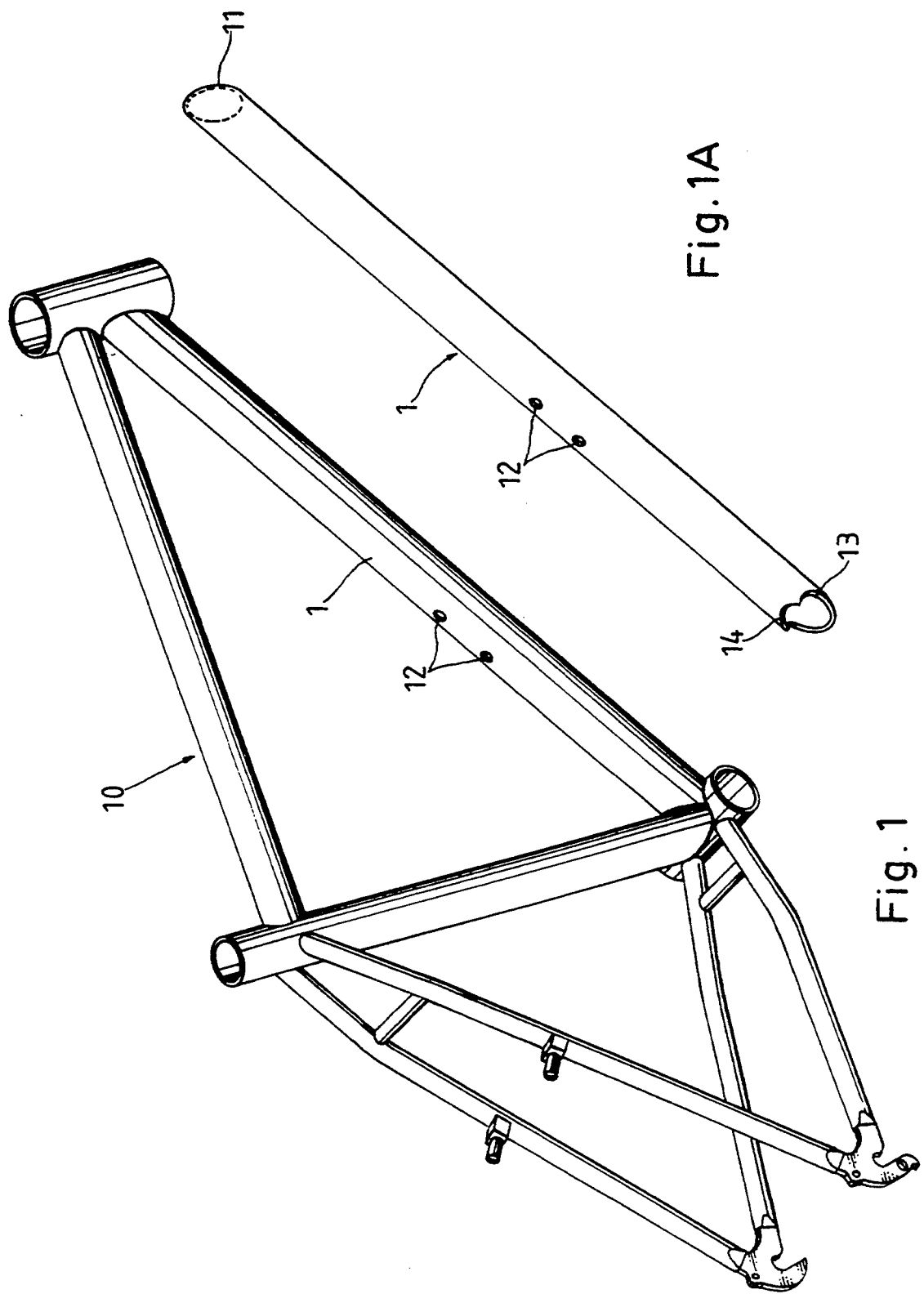
FIG. 1 is an elevational view of a regular bicycle frame.
Figure 2:
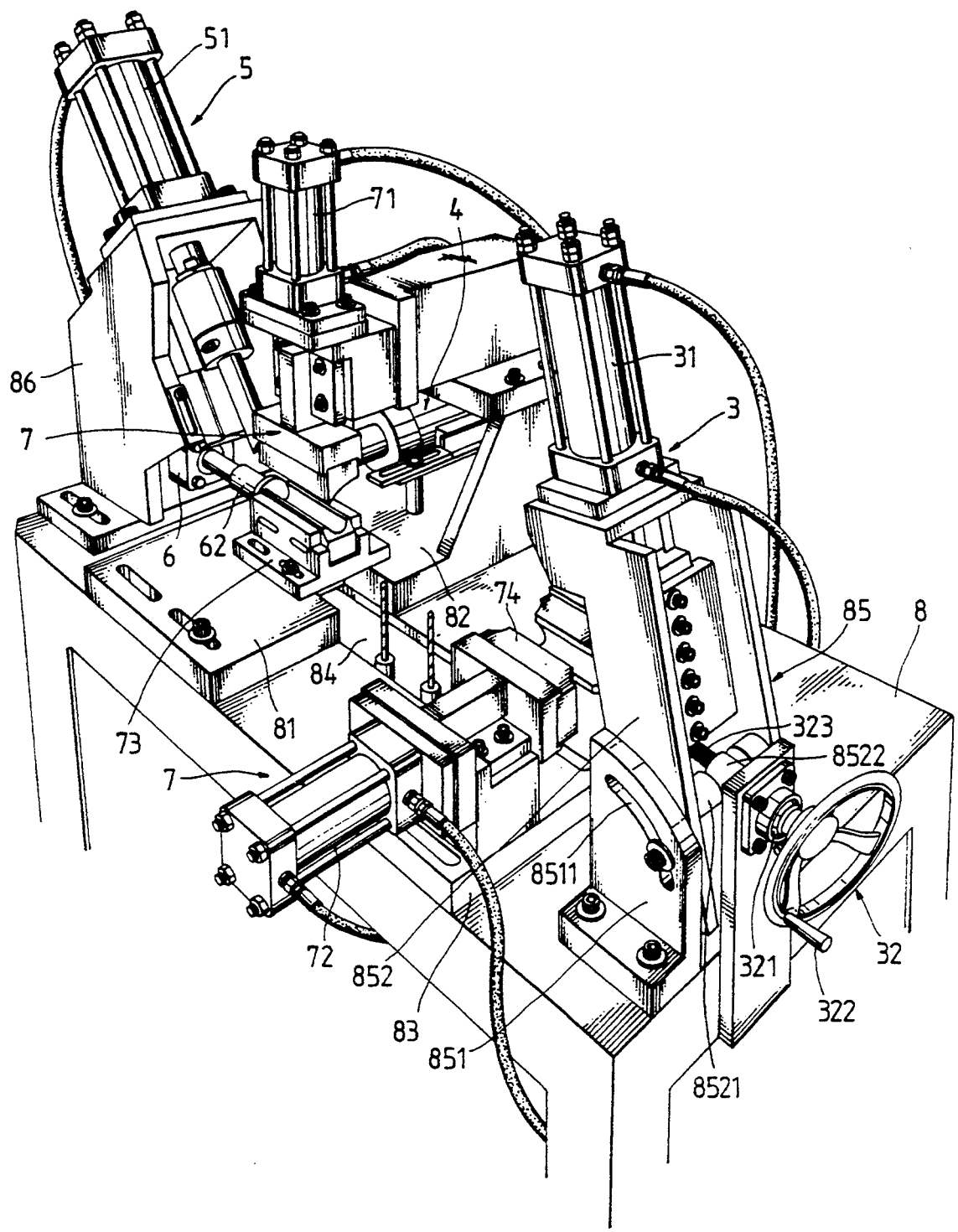
FIG. 2 is an elevational view of a bicycle downtube processing machine according to the preferred embodiment of the present invention.
Figure 3:
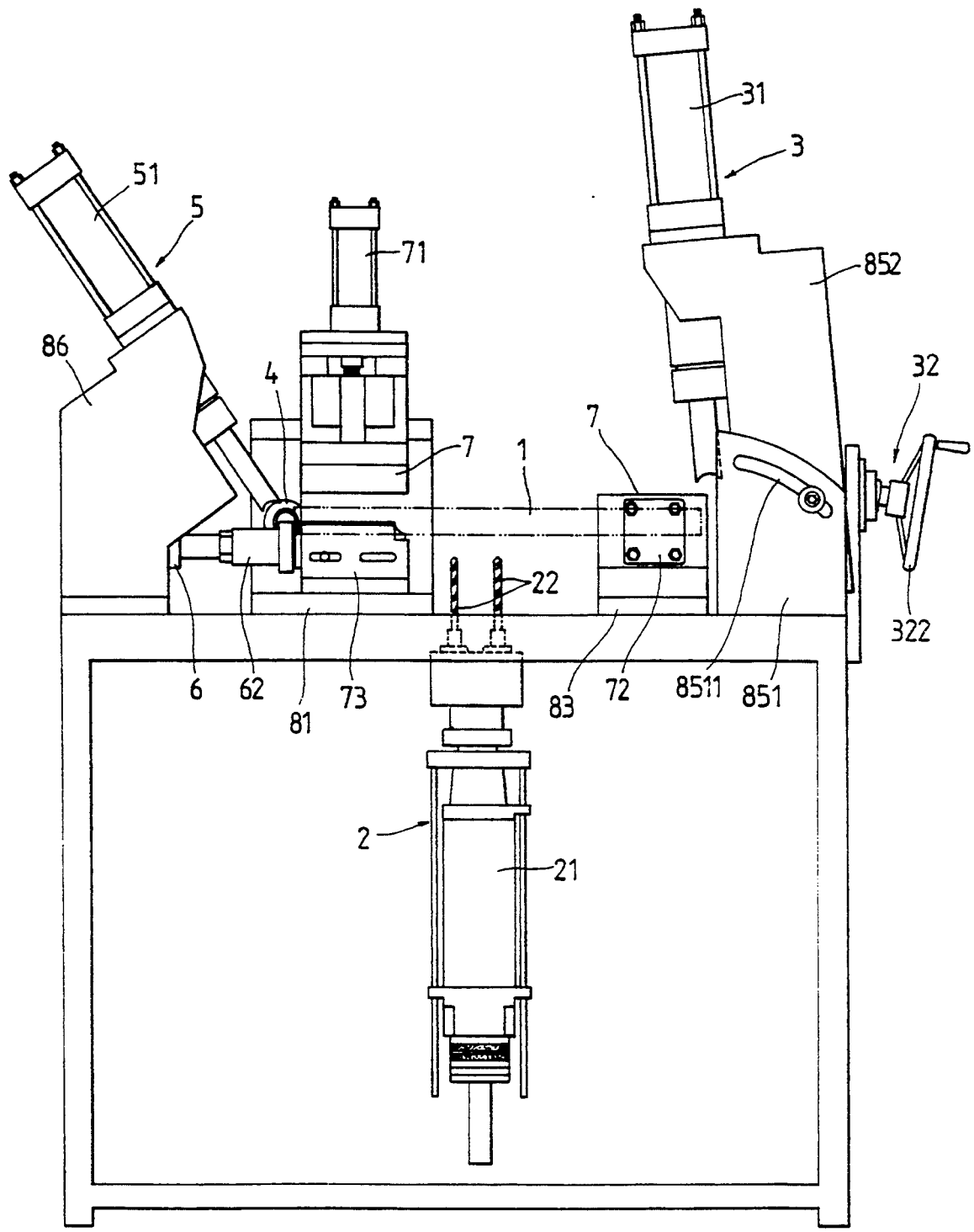
FIG. 3 is a front view of the bicycle downtube processing machine shown in FIG. 2.
Figure 4:
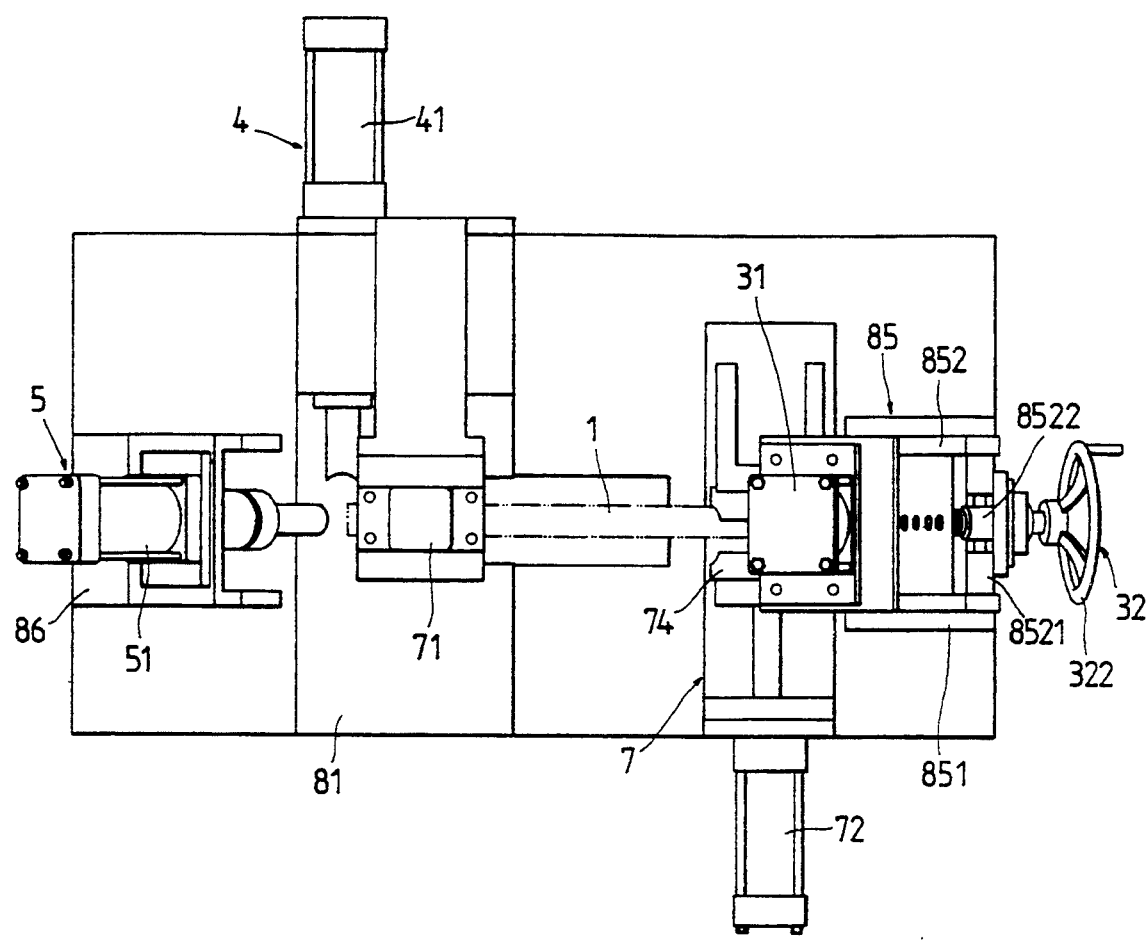
FIG. 4 is a top view of the bicycle downtube processing machine shown in FIG. 2.
Figure 5:
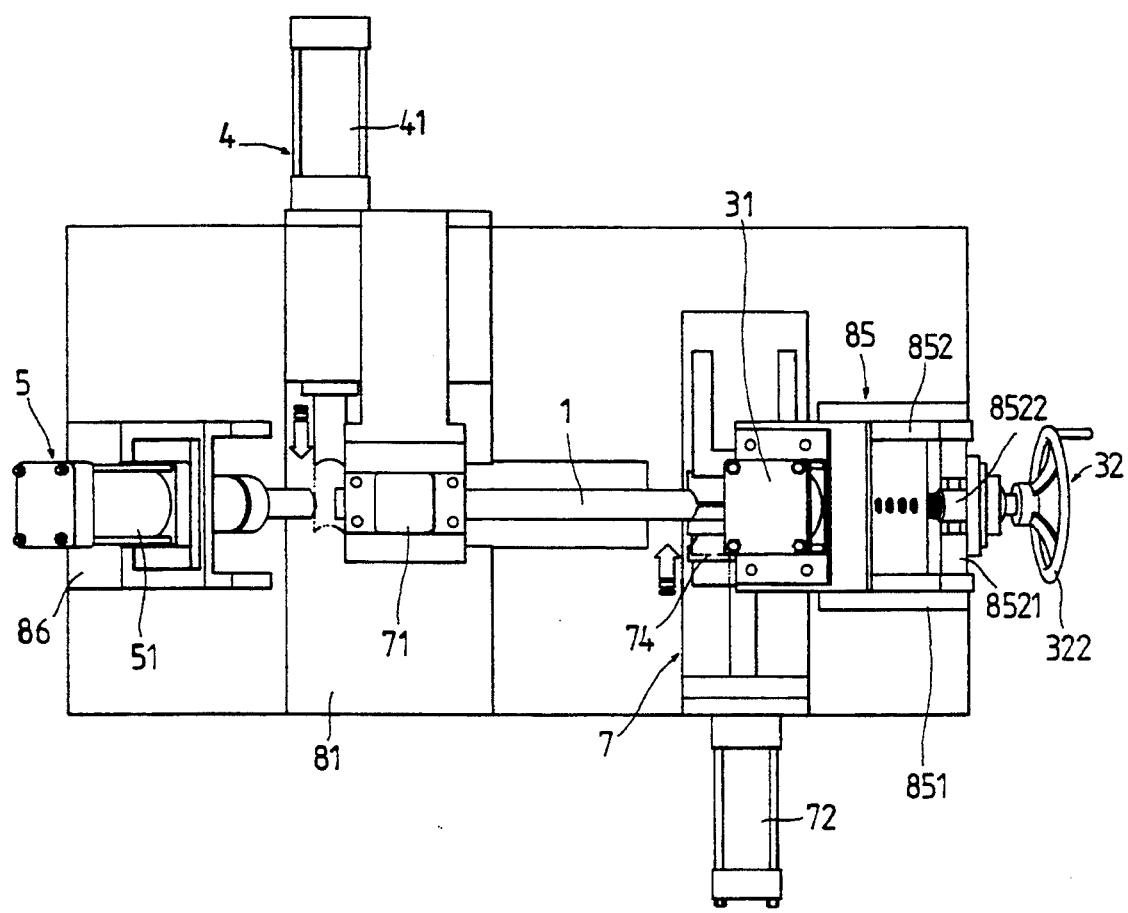
FIG. 5 is similar to FIG. 4 but showing the first and second locating unit and the second cutting unit operated.
Figure 6:
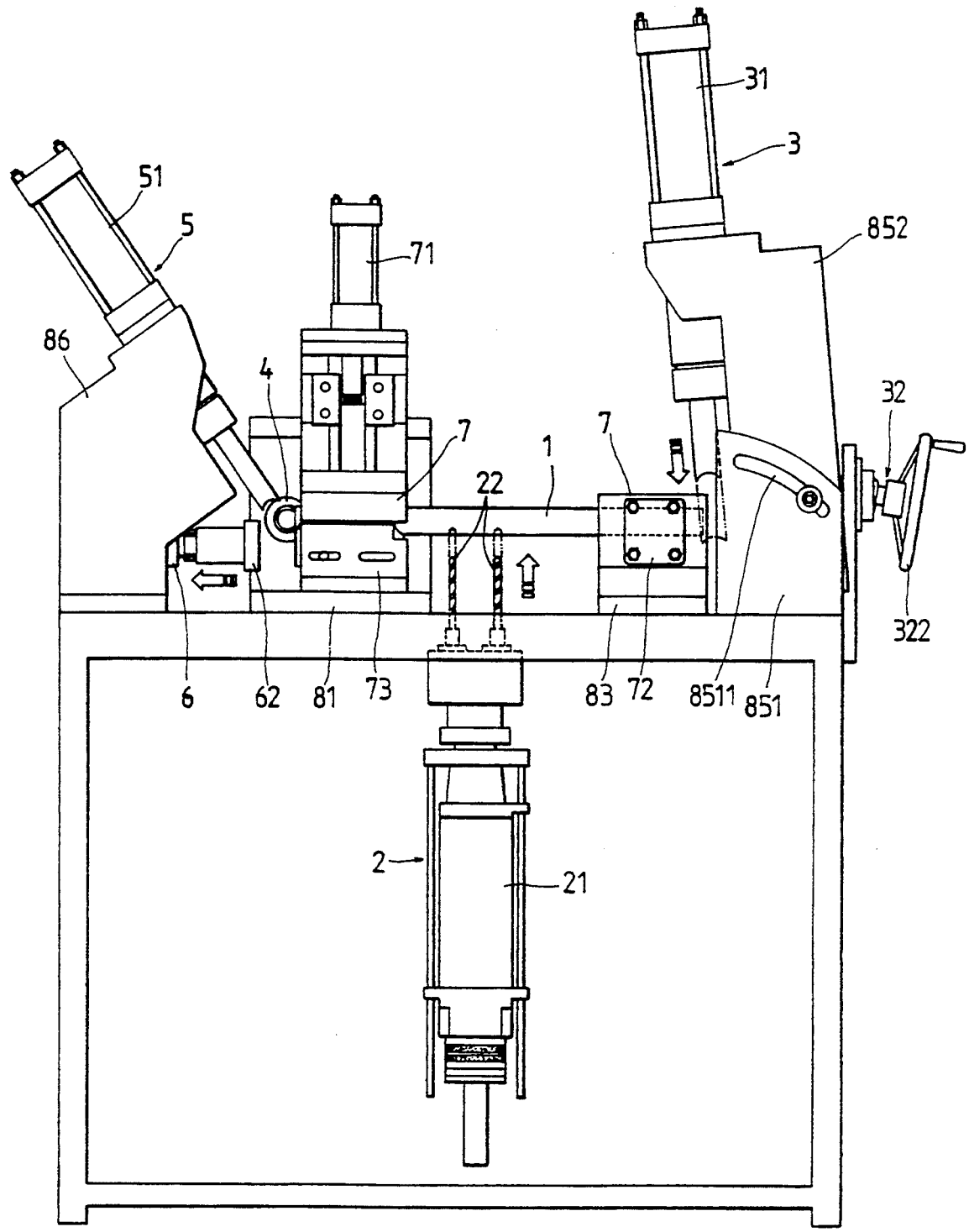
FIG. 6 is similar to FIG. 3 but showing the drill unit operated.
Figure 7:
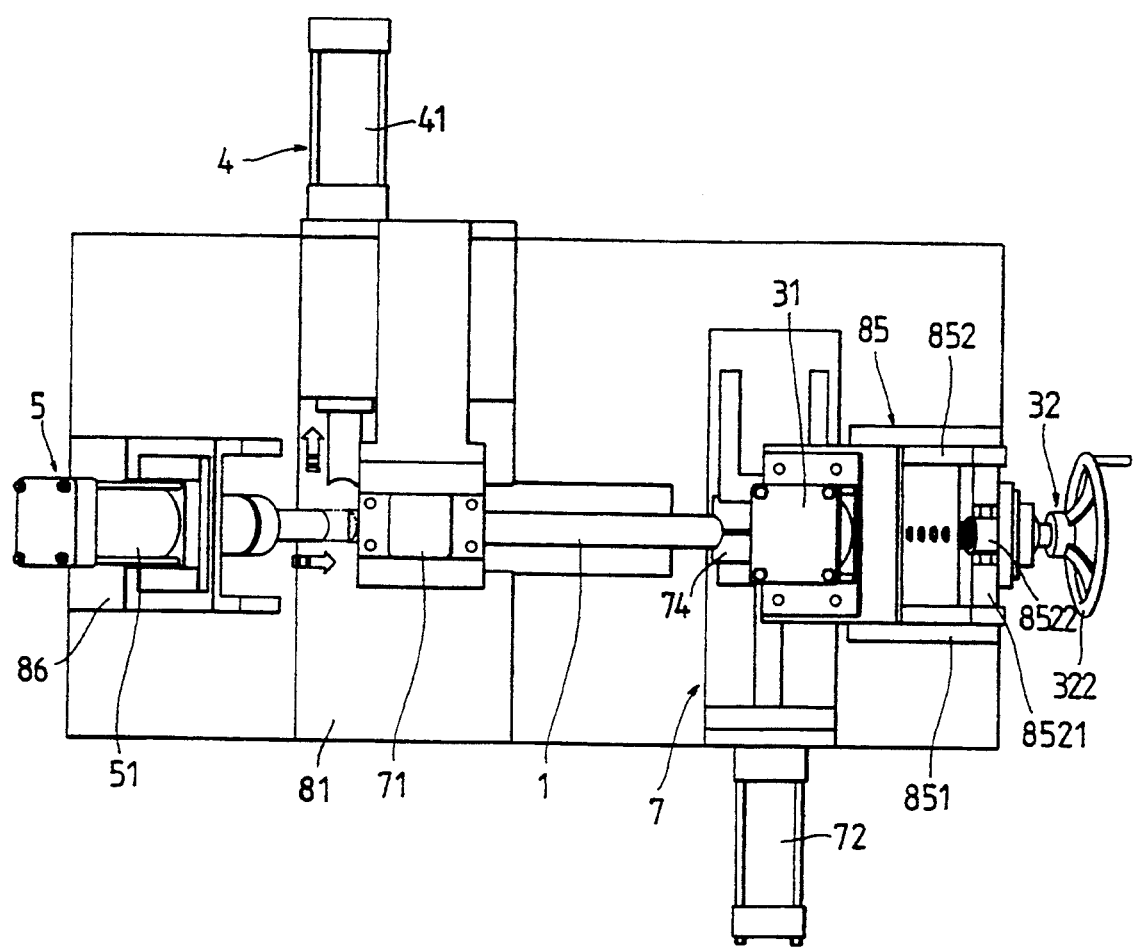
FIG. 7 is similar to FIG. 4 but showing the third cutting unit operated.
Figure 8:
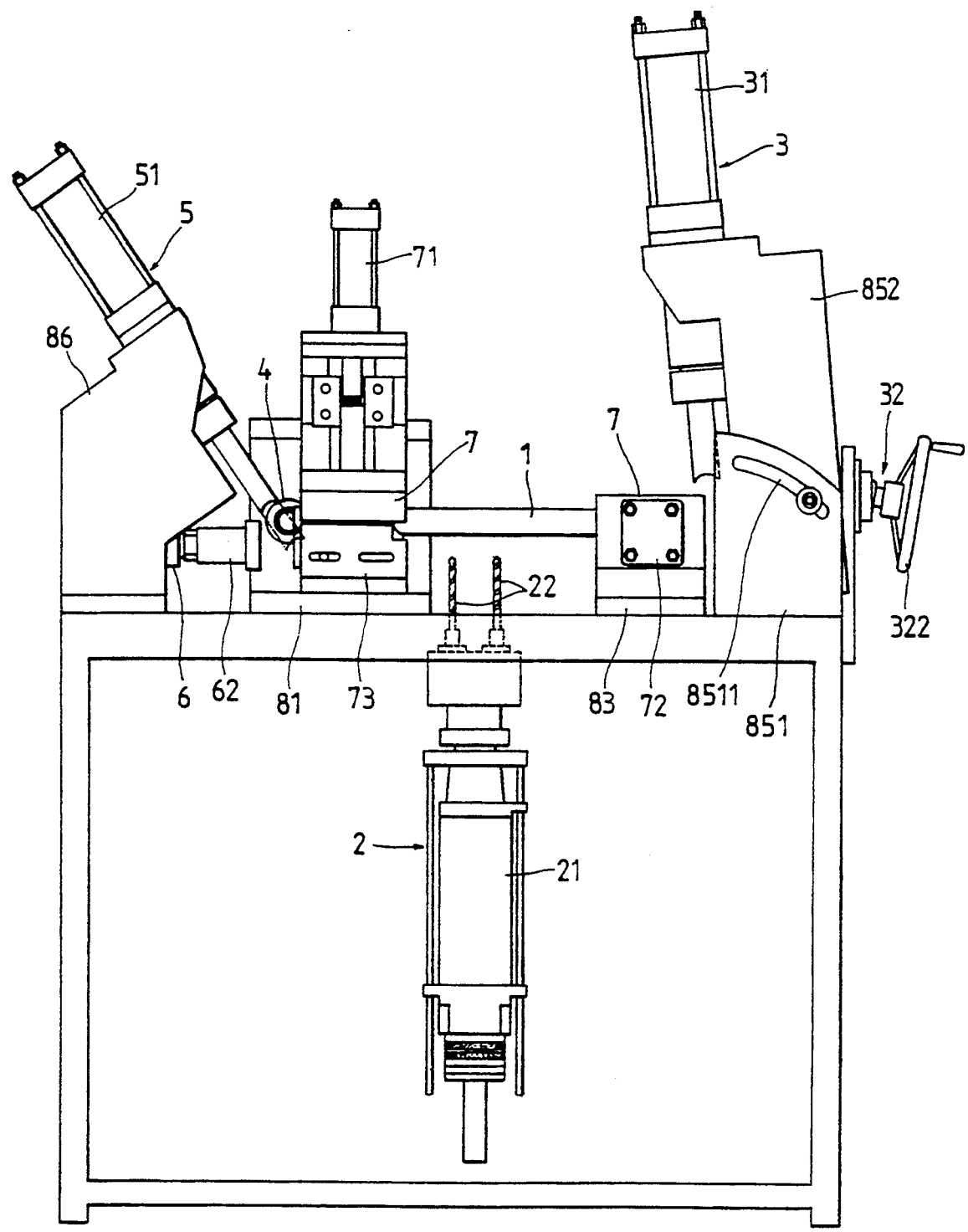
FIG. 8 is similar to FIG. 3 but showing the second cutting unit operated.
Figure 9:
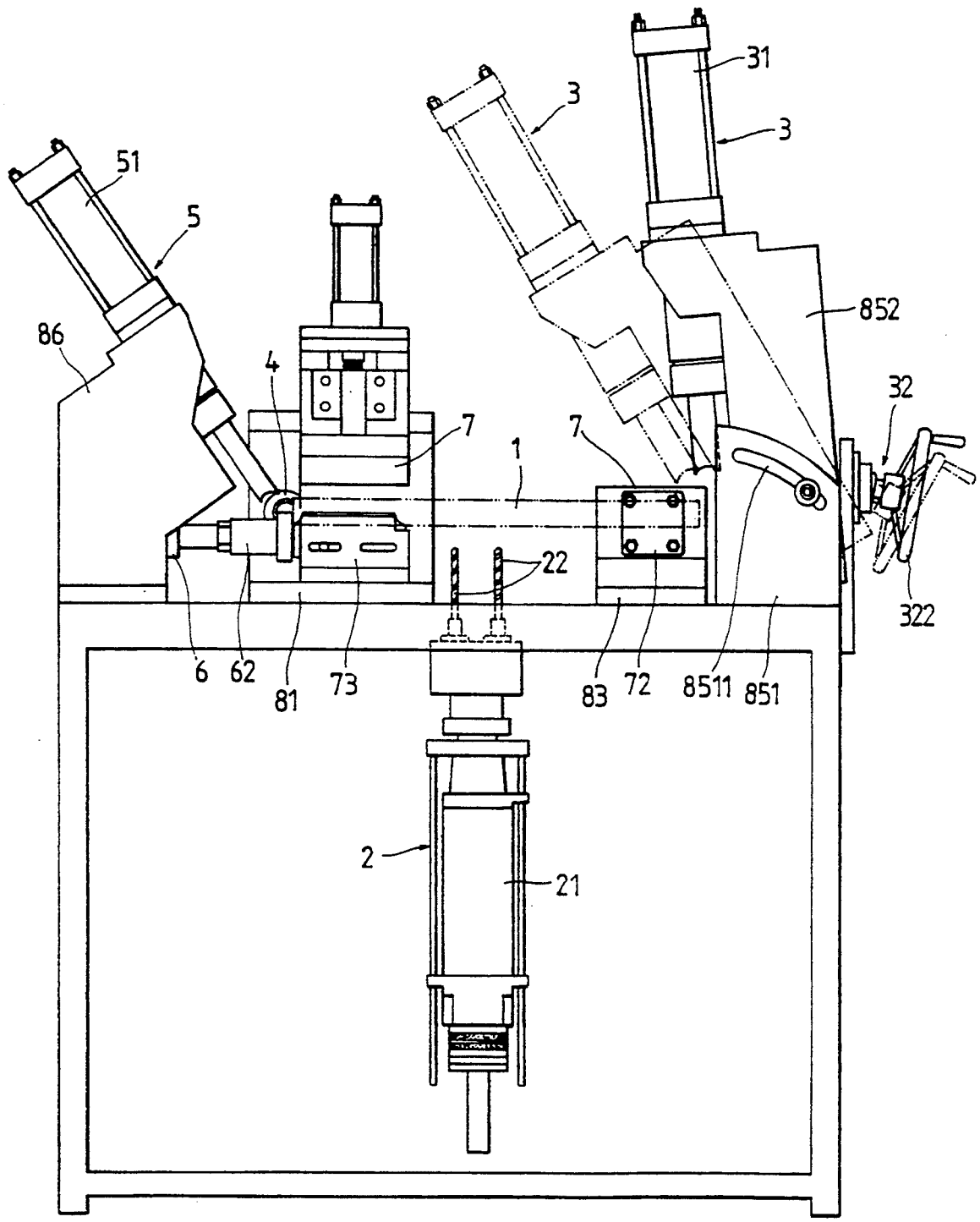
FIG. 9 is similar to FIG. 3 out showing the right support adjusted.

Referring to the annexed drawings in detail, a bicycle downtube processing machine in accordance with the preferred embodiment of the present invention includes a drill unit 2 for drilling holes 12 on the downtube 1 for the bicycle frame 10 to be processed, a first cutting unit 3 for cutting the right end 11 of the downtube 1 by punching, a second cutting unit 4 for cutting a downwards bevel edge 13 on the left end of the downtube 1 by punching, a third cutting unit 5 for cutting an inwardly curved top edge 14 on the left end of the downtube 1 by punching, a first locating unit 6 for moving the downtube 1 to the processing position for processing, a second locating unit 7 for holding down the downtube 1 in position for processing, and a control circuit for controlling the operation of the aforesaid units.

The first locating unit 6 is mounted on the bottom of a left support 86 being mounted on the top of the machine base 8 on the left side, comprising a hydraulic cylinder 61 and a movable rod 62 controlled by the hydraulic cylinder 61 to stop the downtube 1 in the processing position.

Figure 10:
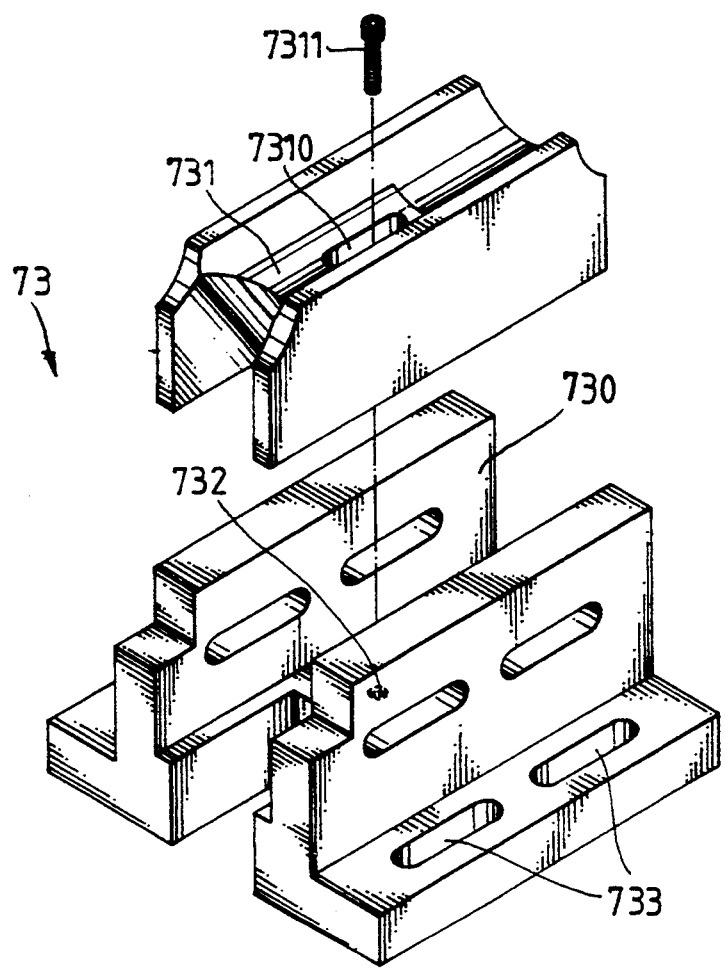
FIG. 10 is an exploded view of the left jaw plate of the second locating unit.
Figure 11:
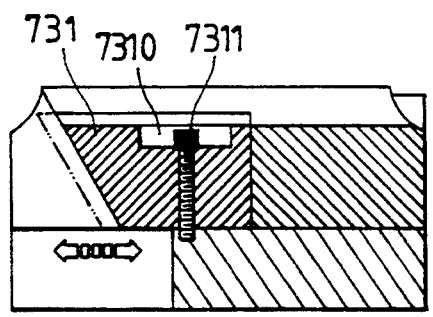
FIG. 11 is a cross section of the left jaw plate of the second locating unit.

The second locating unit 7 is mounted on the machine base 8 in the middle, comprising a left hydraulic cylinder 71, a right hydraulic cylinder 72, a left jaw plate 73 fastened between two slides 81; 82 on the machine base 8 and moved by the left hydraulic cylinder 71, and a right jaw plate 74 moved by the right hydraulic cylinder 72. As illustrated in FIGS. 10 and 11, the left jaw plate 73 comprises a jaw base 730 having a screw hole 732 on the bottom and two opposite pairs of longitudinally aligned elongated mounting holes 733 on two opposite sides thereof respectively fastened to the slides 81; 82 by screws (not shown), and a movable hydraulic cylinder mounting plate 731 having an elongated hole 7310 longitudinally disposed in the middle and fastened to the screw hole 732 by a screw 7311.

The drill unit 2 is mounted on the machine base 8 at the bottom, comprising a hydraulic cylinder 2, and two drills 22 mounted on the hydraulic cylinder 2 and moved out of an opening 84 on the top of the machine base 8 and controlled by the control circuit to drill holes 12 on the downtube 1.

The first cutting unit 3 is mounted on a right support 85 on the right side of the machine base 8 at the top, comprising a hydraulic cylinder 31 and a cutting tool (not shown) moved by the hydraulic cylinder 31 to cut the downtube 1. The punching angle of the cutting tool on the hydraulic cylinder 31 can be adjusted by changing the angular position of the right support 85 on the machine base 8. The right support 85 comprises two opposite upright frames 851 fixed to the machine base 8 on the right side at the top and having a respective sliding slut 8511, a movable frame 852 fastened to the sliding slot 8511 by a cross bar 8521 thereof to support the first cutting unit 3, a swivel member 8522 made on the cross bar 8521 in the middle and having a screw hole (not shown), a hand wheel set 32 having a hand wheel 322 mounted on the machine base 8 by a socket 321 and a screw rod 323 threaded into the screw hole on the swivel member and driven by the hand wheel 322 to adjust the angular position of the movable frame 852 relative to the upright frames 851.

The second cutting unit 4 comprises a hydraulic cylinder 41 mounted on the slide 82, and a cutting tool (not shown) moved by the hydraulic cylinder 41 to cut the downtube 1.

The third cutting unit 5 comprises a hydraulic cylinder 51 mounted on the left support 86 at the top, and a cutting tool (not shown) moved by the hydraulic cylinder to cut the downtube 1. The punching angle of the cutting tool on the hydraulic cylinder 51 can be adjusted by changing the angular position of the hydraulic cylinder 51 on the left support 86. Adjusting the angular position of the hydraulic cylinder 51 on the left support 86 can be easily achieved by conventional techniques.

By means of the control of the control circuit, the aforesaid hydraulic cylinders 31; 41; 51; 61; 71; 72 and the drills 22 are operated in proper order to process the downtube 1 automatically.

We claim:

1. A bicycle downtube processing machine comprising:

a machine base having a left support on the left side at the top and a right support on the right side at the top;

a drill unit mounted on said machine base at the bottom for drilling holes on the downtube to be processed, said drill unit comprising a hydraulic cylinder and two drills mounted on the hydraulic cylinder and moved out of an opening on said machine base and controlled to drill holes on the downtube;

a first cutting unit mounted on said right support for cutting the right end of the downtube by punching, said first cutting unit comprising a first cutting tool and a hydraulic cylinder controlled to reciprocate said first cutting tool causing it to punch the right end of the downtube;

a second cutting unit for cutting a downwards bevel edge on the left end of the downtube by punching, said second cutting unit comprising a cutting tool and a hydraulic cylinder mounted on said second slide and controlled to reciprocate said second cutting tool causing it to punch the downwards bevel edge on the left end of the downtube;

a third cutting unit for cutting an inwardly curved top edge on the left end of the downtube by punching, said third cutting unit comprising a third cutting tool and a hydraulic cylinder mounted on said left support and controlled to move said third cutting tool causing it to punch an inwardly curved top edge on the left end of the downtube;

a first locating unit mounted on said left support at the bottom for moving the downtube to the processing position for processing, said first locating unit comprising a movable rod and a hydraulic cylinder to move said movable rod causing it to stop the downtube in the processing position;

a second locating unit mounted on said machine base in the middle at the top for holding down the downtube in position for processing, said second locating unit comprising a left hydraulic cylinder, a right hydraulic cylinder, a left jaw plate fastened between a first slide and a second slide on said machine base and moved by the right hydraulic cylinder; and a control circuit for controlling the operation of the hydraulic cylinders of said first, second and third cutting units and said first and second locating units and said drill unit and the drills of said drill unit.

2. The bicycle downtube processing machine of claim 1 wherein said left jaw of said second locating unit comprises a jaw base having a screw hole on the bottom and two opposite pairs of longitudinally aligned elongated mounting holes on two opposite sides thereof respectively fastened to said first and second slides by screws, and a movable hydraulic cylinder mounting plate having an elongated hole longitudinally disposed in the middle and fastened to the screw hole on said jaw base by a screws.

3. The bicycle downtube processing machine of claim 1 wherein said right support comprises two opposite upright frames fixed to said machine base on the right side at the top and having a respective sliding slot, a movable frame fastened to the sliding slot of each upright frame by a cross bar thereof to support said first cutting unit, a swivel member made on said cross bar in the middle and having a screw hole, a hand wheel set having a hand wheel mounted on said machine base by a socket and a screw rod threaded into the screw hole on said swivel member driven by said hand wheel to adjust the angular position of said movable frame relative to said upright frames.

* * * * *